(12) United States Patent
Aghor

(10) Patent No.: US 9,185,218 B2
(45) Date of Patent: Nov. 10, 2015

(54) SYSTEM AND METHOD FOR HIGHLY ASSURED DELIVERY OF AN IMPORTANT SEGMENT OF AN AUTOMATED CALL

(71) Applicant: Avaya Inc., Basking Ridge, NJ (US)

(72) Inventor: Shriwallabh Aghor, Wadgaonsheri Pune (IN)

(73) Assignee: Avaya Inc., Basking Ridge, NJ (US)

( * ) Notice: Subject to any disclaimer, the term of this patent is extended or adjusted under 35 U.S.C. 154(b) by 164 days.

(21) Appl. No.: 13/859,156

(22) Filed: Apr. 9, 2013

(65) Prior Publication Data

US 2014/0301538 A1   Oct. 9, 2014

(51) Int. Cl.
| | |
|---|---|
| *H04M 1/64* | (2006.01) |
| *H04M 3/51* | (2006.01) |
| *H04M 3/42* | (2006.01) |
| *H04M 3/424* | (2006.01) |
| *H04M 3/428* | (2006.01) |

(52) U.S. Cl.
CPC ............ *H04M 3/5158* (2013.01); *H04M 3/424* (2013.01); *H04M 3/4286* (2013.01); *H04M 2203/306* (2013.01)

(58) Field of Classification Search
CPC ................ H04M 2203/303; H04M 2203/551; H04M 3/5166; H04M 3/53333

USPC ............... 379/88.01–88.19; 455/414.1
See application file for complete search history.

(56) References Cited

U.S. PATENT DOCUMENTS

| | | | |
|---|---|---|---|
| 6,259,772 B1 * | 7/2001 | Stephens et al. ........... | 379/88.23 |
| 2005/0216549 A1 * | 9/2005 | Amano et al. ............... | 709/202 |
| 2006/0126804 A1 * | 6/2006 | Lee et al. ................... | 379/88.01 |
| 2007/0180042 A1 * | 8/2007 | Benco et al. ................ | 709/207 |
| 2008/0046599 A1 * | 2/2008 | Hutson et al. .............. | 710/1 |
| 2010/0128855 A1 * | 5/2010 | Demo et al. ............... | 379/88.13 |
| 2010/0151831 A1 * | 6/2010 | Hao et al. ................... | 455/412.2 |
| 2010/0251304 A1 * | 9/2010 | Donoghue et al. ........... | 725/46 |
| 2014/0113596 A1 * | 4/2014 | Filev et al. ................. | 455/412.1 |

* cited by examiner

*Primary Examiner* — Solomon Bezuayehu
(74) *Attorney, Agent, or Firm* — Maldjian Law Group LLC

(57) ABSTRACT

System and method to administer an outbound automated call from a call center, including: starting playback of an automated message during a call from a caller to a callee, wherein the message comprises a first portion having a first level of importance and a second portion having a second level of importance, wherein the second level of importance is greater than the first level of importance; detecting that the caller has disconnected the call; stopping playback of the message; and determining whether the second portion of the message has been played. Embodiments may further include rescheduling the call if the second portion of the message has not been played.

8 Claims, 5 Drawing Sheets

300

500

US 9,185,218 B2

SYSTEM AND METHOD FOR HIGHLY ASSURED DELIVERY OF AN IMPORTANT SEGMENT OF AN AUTOMATED CALL

BACKGROUND

1. Field of the Invention

Embodiments of the present invention generally relate to outbound call center calling, and, in particular, to a system and method for efficiently rescheduling call-back calls depending on whether or not a callee has listened to an important part of the message.

2. Description of Related Art

Automated outbound callers at an outbound call center are known in the related art. Such automated callers are often used to place calls and, if and when a callee answers, deliver a message such as by playing an automated message or by connecting to an agent who will read from a script.

However, when a callee answers such a call, there is no assurance that the callee will listen to the entire message. A callee may hang up (i.e., disconnect from the call) before the entire message has been played or spoken. Or, the callee may place the call on hold while the message is played or spoken.

Some messages may be important to assure delivery to a callee. Some messages may be delivered effectively in more than one segment. Some messages may have a portion which is more important to deliver than another portion. If the call is handled by a live agent, the agent can detect that the callee has disconnected or placed the call on hold, and take appropriate action. However, automated outbound dialers lack sufficient capability to detect when a call has been disconnected or put on hold, and then later place again the call by starting where the previous message left off.

Thus, a need exists to mitigate the shortcomings of the known art.

SUMMARY

Embodiments of the present invention generally relate to outbound call center calling, and, in particular, to a system and method for efficiently rescheduling call-back calls depending on whether or not a callee has listened to an important part of the message.

Embodiments in accordance with the present invention address a need to provide more intelligent redelivery of uncompleted message delivery, in order to provide greater assurance of delivery of important information with less intrusion to callees.

Embodiments in accordance with the present invention may provide a system and method to administer an outbound automated call from a call center, including: starting playback of an automated message during a call from a caller to a callee, wherein the message comprises a first portion having a first level of importance and a second portion having a second level of importance, wherein the second level of importance is greater than the first level of importance; detecting that the caller has disconnected the call; stopping playback of the message; and determining whether the second portion of the message has been played. Embodiments may further include rescheduling the call if the second portion of the message has not been played.

Embodiments in accordance with the present invention may include a system and method to restart a partially-delivered outbound automated call from a call center, including: determining a restart point in an automated message to a callee; and starting playback of the automated message at the restart point during a call from a caller to the callee, wherein the automated message comprises a first portion having a first level of importance and a second portion having a second level of importance, wherein the second level of importance is greater than the first level of importance. In some embodiments, the restart point includes a point in time no later than a start of the second portion.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
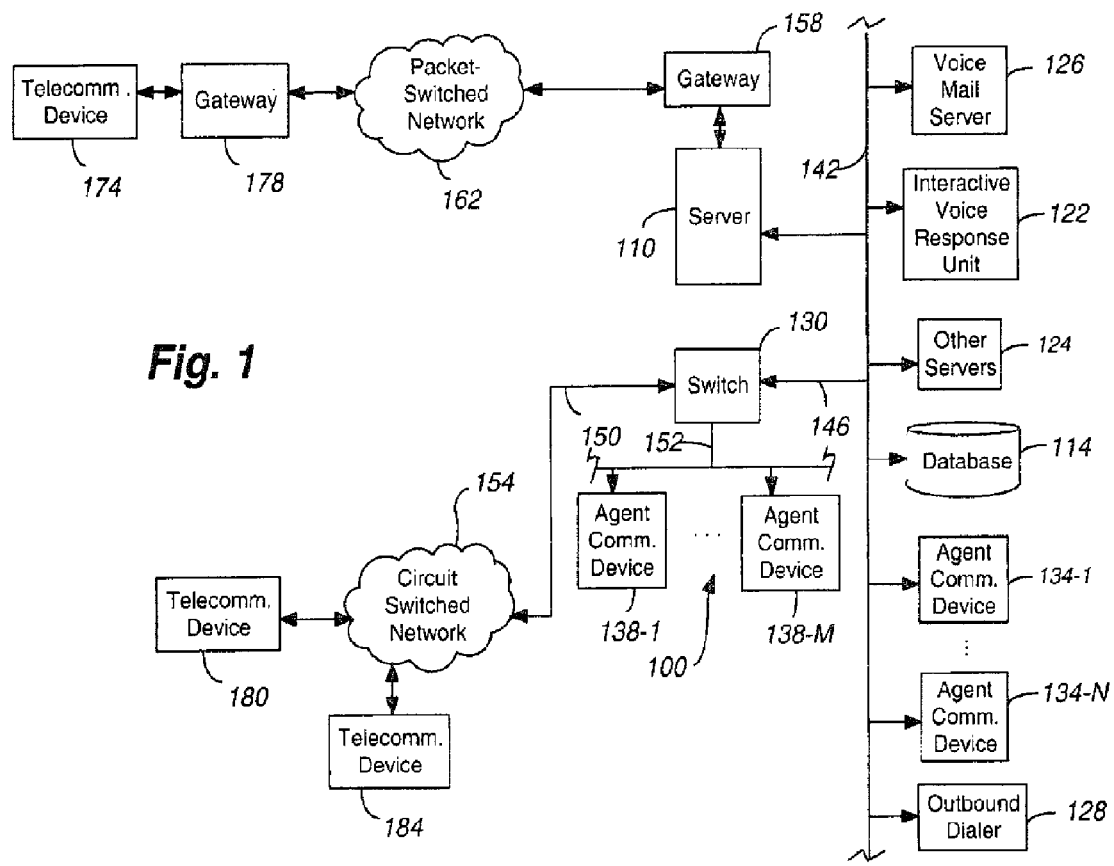
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize automated outbound callers.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Embodiments of the present invention generally relate to outbound call center calling, and, in particular, to a system and method for efficiently rescheduling call-back calls depending on whether or not a callee has listened to an important part of the message.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts an illustrative embodiment of a contact center of the present invention where contact center agents may service their assigned contacts, either singularly or in multiples, simultaneously or substantially simultaneously. A contact center 100 comprises a central server 110, a set of data stores or databases 114, which may or may not be contained within the central server 110, a database 114, representing one or more databases, containing agent metrics, contact or customer related information, agent availability data, and other information that can enhance the value and efficiency of the contact's experience, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142.

The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The server and/or switch can be a software-controlled system including a processing unit (CPU), microprocessor, or other type of digital data processor executing software or an Application-Specific Integrated Circuit (ASIC) as well as various portions or combinations of such elements.

Referring again to FIG. 1, the gateway 158 can be Avaya Inc.'s, G700 Media Gateway™, and may be implemented as hardware such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to, and receive outgoing contacts or calls, from these extensions in a conventional manner. The second telecommunication devices can include, for example, wired and wireless telephones, PDAs, H.320 video phones and conferencing units, voice messaging and response units, and traditional computer telephony adjuncts.

It should be noted the present invention does not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (e.g., a call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected agent.

The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agent will then process the contact(s) sent to him/her by the server 110.

A call center typically uses automated dialers to deliver outbound messages. The messages may be used for various purposes, such as a sales campaign, or to inform the callee of a reminder scenarios, or inform the callee of a change in status of an event that the callee wishes to be informed of (e.g., delayed or cancelled airplane flight), bill collector, public notification of school closings, public notification of emergency situations, etc. Once the call is answered, an automated message is played. In some instances the callee may be prompted or allowed to enter a selection (e.g., by DTMF entry or voice recognition), and a different message may be played depending upon the selection by the callee.

If the automated message is not delivered to the callee (e.g., the callee hangs up, or the callee places the call on hold, etc.), systems and methods of the known art may mark the callee as having been contacted and/or the call as having been delivered, without regard to how much of the call had been delivered. In such situations, the caller may receive a false perception of success of the outbound call.

Embodiments in accordance with the present invention mitigate this shortcoming of the known art by controlling playback or redelivery of an automated message based upon detection of how much of a call has been delivered to the callee.

Systems and methods in accordance with an embodiment of the present invention may detect when a callee has placed a call on hold. For example, in a call that is transported by the RTCP protocol, the callee's terminal may stop sending media stream packets when the callee's terminal is placed on hold. A call placed on hold may be detected if the held party receives a MOH ("Music on Hold"). This music on hold may be provided by either the holding party, or by a media server on behalf of the holding party or locally by the held party. In contrast, if the callee places a call on mute, there is no MOH and the callee may still be listening to the call on mute. Since the callee is not actively listening to the call when the call is on hold, it is advantageous to pause the automated message for a limited period of time in case the callee returns to the call. If the callee does not return before the expiration of a timeout period, the caller may terminate the call, but treat the call for further processing as if the callee had dropped the call.

A recorded call may be divided into one or more segments, some of which may have various levels of importance to either the caller or callee. For example, an outbound call campaign to sell magazine subscriptions may use an automated message that includes segments for a greeting, a reason for calling, the name of the magazine, the terms of the offer, and information about how to accept the offer. Certain segments such as those including the name of the magazine and the offer may be deemed by the caller to be most important to deliver. If a callee drops a call, the known art does not adequately take into account how much of an automated message may have been delivered before the callee dropped the call. The known art also does not adequately take into account whether a call may have been placed on hold. A call placed on hold may indicate that the call had been answered by a person other than the intended callee (e.g., by a receptionist instead of by a decision-maker). Such known art risks providing insufficient assurance to the caller that important messages have been delivered, and/or risks annoying a callee who receives unnecessary callbacks.

Embodiments in accordance with the present invention address the shortcomings of the known art by tracking how much of an automated message is delivered to a callee. Tracking may be by way of a timer, or by saving an indication when a segment of the call has been played, and so forth. If the call is not completed, embodiments responsively determine whether to call back the callee and, if so, how much of the automated call to replay to the callee. For example, the entire automated message may be replayed during a second call, or during the second call the automated message may be restarted at or slightly before the location at which the callee disconnected from the first call, or during the second call the automated message may be restarted at the start of the first uncompleted segment, etc. Or, if sufficient important segment(s) of the call were delivered during the first call, embodiments may not place a second call in order just to deliver remaining undelivered segments of the automated message.

In some embodiments in accordance with the present invention, a time delay between the first and second calls may used to help determine how much of the automated message to replay during a second call. For example, if the time delay is short, the first call may be fresh in the memory of the callee, and the second call may replay less of the call already played during the first call. On the other hand, if the time delay is greater, more of the automated call may be replayed. Beyond a predetermined time threshold for the time delay, the automated message may be replayed from the beginning.

Figure 2:
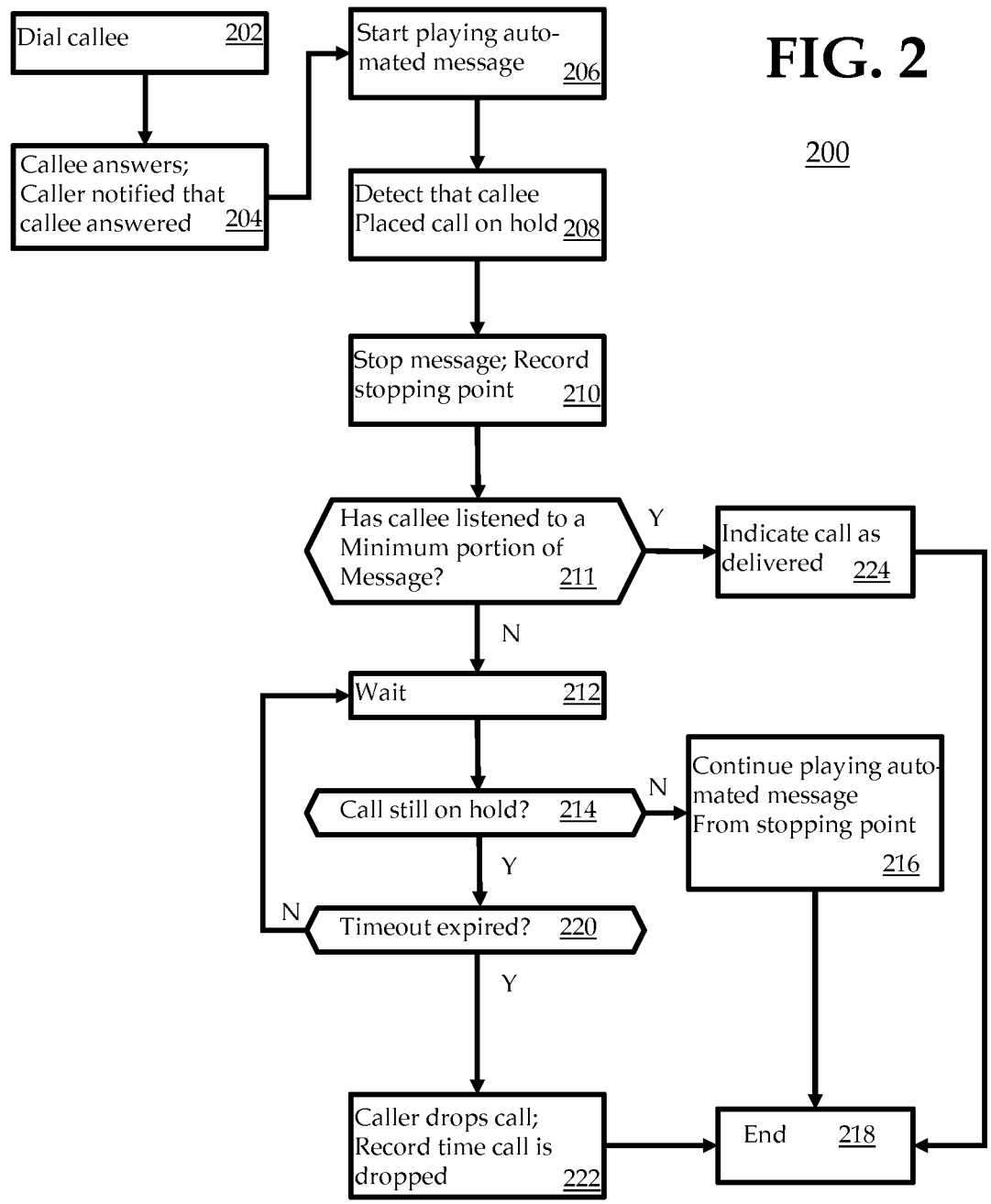
FIG. 2 illustrates at a high level of abstraction a process to handle a call placed on hold by a callee, in accordance with an embodiment of the present invention.

FIG. 2 illustrates a process 200 in accordance with an embodiment of the present invention. Process 200 may be useful when a callee places a call on hold. At step 202, a caller calls a callee. Next, at step 204, the callee answers the phone call, and the caller receives notification by well-known methods that the call was answered. Next, at step 206, the caller starts playing an automated message.

Next, at step 208, the caller may detect during the playback of the automated message that the callee has placed the call on hold. Detection may be by way of a MOH indicator described earlier. Alternatively, a PBX may provide a notification that a call had been put on hold. In another embodiment, the content of the audio stream (e.g., music) may be examined in order to infer that the call has been placed on hold. Next, at step 210, upon having detected that the callee placed the call on hold, the caller temporarily stops playback of the automated message. The caller records the point in the automated message at which the playback was stopped. The stopping point may be indicated by an elapsed time, or a counter, a segment indicator, and so forth. The date and time at which the playback was temporarily stopped also may be recorded in step 210, or may be recorded later if the caller drops the call.

Alternatively at step 210, if a sufficient amount of the automated message has already been played, e.g., important segments were played or a minimum amount of the automated message had been played, the caller may drop the call rather than wait while the call is on hold.

Next, at decision step 211, a decision is made whether the callee has already listened to a sufficient portion of the automated message. The sufficient portion may include at least a portion deemed by the caller to be critical. If the result of decision step 211 is affirmative, then control of process 200 passes to step 224. If the result of decision step 211 is negative, then control of process 200 passes to step 212.

At step 224, the call is indicated as having been delivered. Control of process 200 then transfers to step 218.

At step 212, the caller waits, and in particular the caller may periodically check at decision step 214 whether the call is still on hold. Alternatively, the caller may receive an indication at decision step 214 (without needing to check) that the call is no longer on hold. If the call is no longer on hold, control of process 200 transfers to step 216, at which the caller continues replaying the automated message from a point at or near the stopping point (e.g., from the stopping point, or from the stopping point minus five seconds, or from the start of the last uncompleted segment, etc.). Process 200 then ends, while the automated message is still playing, by transferring to step 218.

After the call has been restarted at step 216, and process 200 has completed at step 218, if the callee again places the call on hold then process 200 will be invoked again. Likewise, if the callee terminates the call then process 300 as described below in connection with FIG. 3 will be performed.

During the automated message, or after the automated message completes, callee input optionally may be accepted (not shown in FIG. 2). The callee input may be, e.g., an indication that the callee wants more information or wants to order an item.

If the result of decision step 214 is positive (i.e., the call is still on hold), control of process 200 transfers to step 220 at which a timeout timer is checked. The timeout timer keeps track of how long the call has been on hold, and at step 220 the value of the timeout timer is compared to a predetermined threshold value. If the time spent waiting on hold does not exceed the threshold value, then control of process 200 returns to step 212 at which the caller continues to wait while the call is on hold. However, if the result of decision step 220 is positive (i.e., the timeout period has expired), then control of process 200 passes to step 222.

At step 222, the caller drops the call. A time may be associated with the dropped call, such as the time at which the caller dropped the call, or the time at which the callee had placed the call on hold. Then, control of process 200 passes to step 218 at which process 200 ends.

In some embodiments in accordance with the present invention, step 211 of detecting whether a minimum portion of the message has been listened, and step 224 of indicating that the call has been delivered if the result of step 211 is positive, may instead be performed after step 222 when the caller drops the call.

Figure 3:
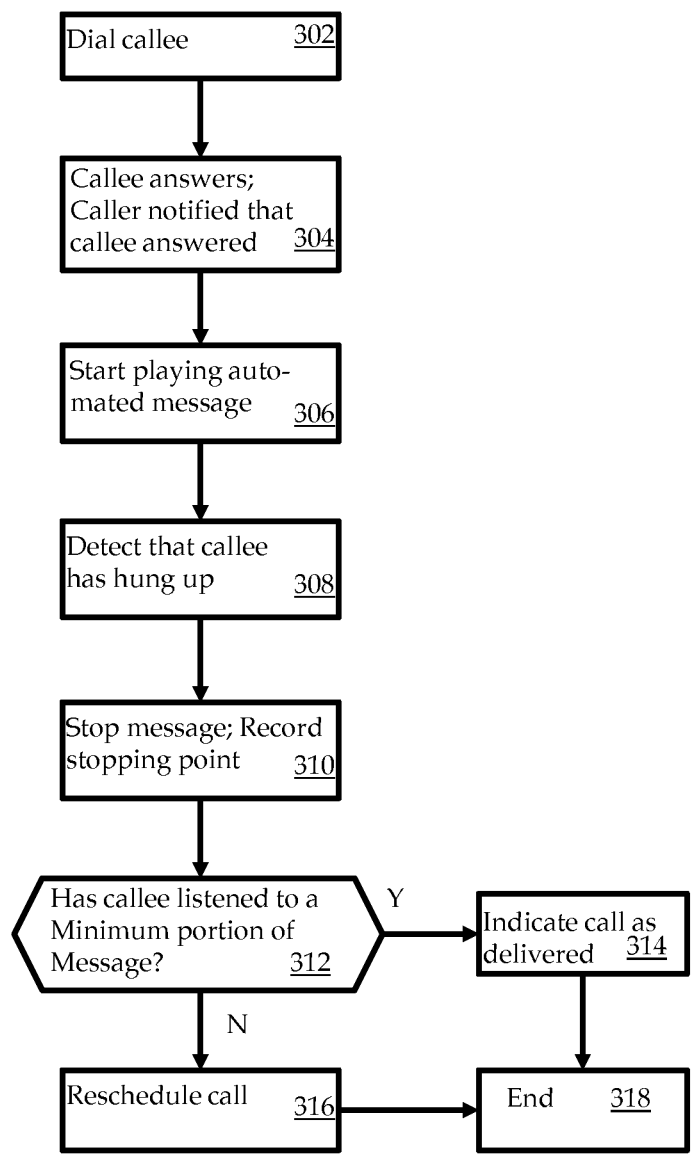
FIG. 3 illustrates at a high level of abstraction a process to handle a call disconnected by a callee, in accordance with an embodiment of the present invention.

FIG. 3 illustrates a process 300 in accordance with an embodiment of the present invention. Process 300 may be useful when a callee hangs up a call before an automated message from a caller has completed playing. At step 302, a caller calls a callee. Next, at step 304, the callee answers the phone call, and the caller receives notification by well-known methods that the call was answered. Next, at step 306, the caller starts playing an automated message.

Next, at step 308, the caller may detect during the playback of the automated message that the callee has disconnected the call, i.e., hung up. Next, at step 310, upon having detected that the callee has hung up, the caller stops playback of the automated message. The caller records the point in the automated message at which the playback was stopped. The stopping point may be indicated by an elapsed time, or a counter, a segment indicator, and so forth. The date and time at which the playback was temporarily stopped may be recorded in step 310, or may be recorded later if it is determined that the call needs to be rescheduled.

Next, at decision step 312, the caller determines whether a sufficient amount of the automated message was played before the callee hung up, e.g., whether important segments were played or a minimum amount of the automated message had been played. If the result of decision step is positive (i.e., a sufficient amount of the message was played), control of process 300 passes to step 314. If the result of decision step is negative (i.e., a sufficient amount of the message was not played), control of process 300 passes to step 316 at which the call is rescheduled or marked for rescheduling. Control of process 300 then passes to step 318 at which process 300 ends.

At step 314, the call may be indicated as being delivered, which removes a need to place the call again. Control of process 300 then passes to step 318 at which process 300 ends.

Persons of skill in the art will recognize that certain steps of process 300 may be performed in a different order than depicted, or may be performed in parallel.

Figure 4:
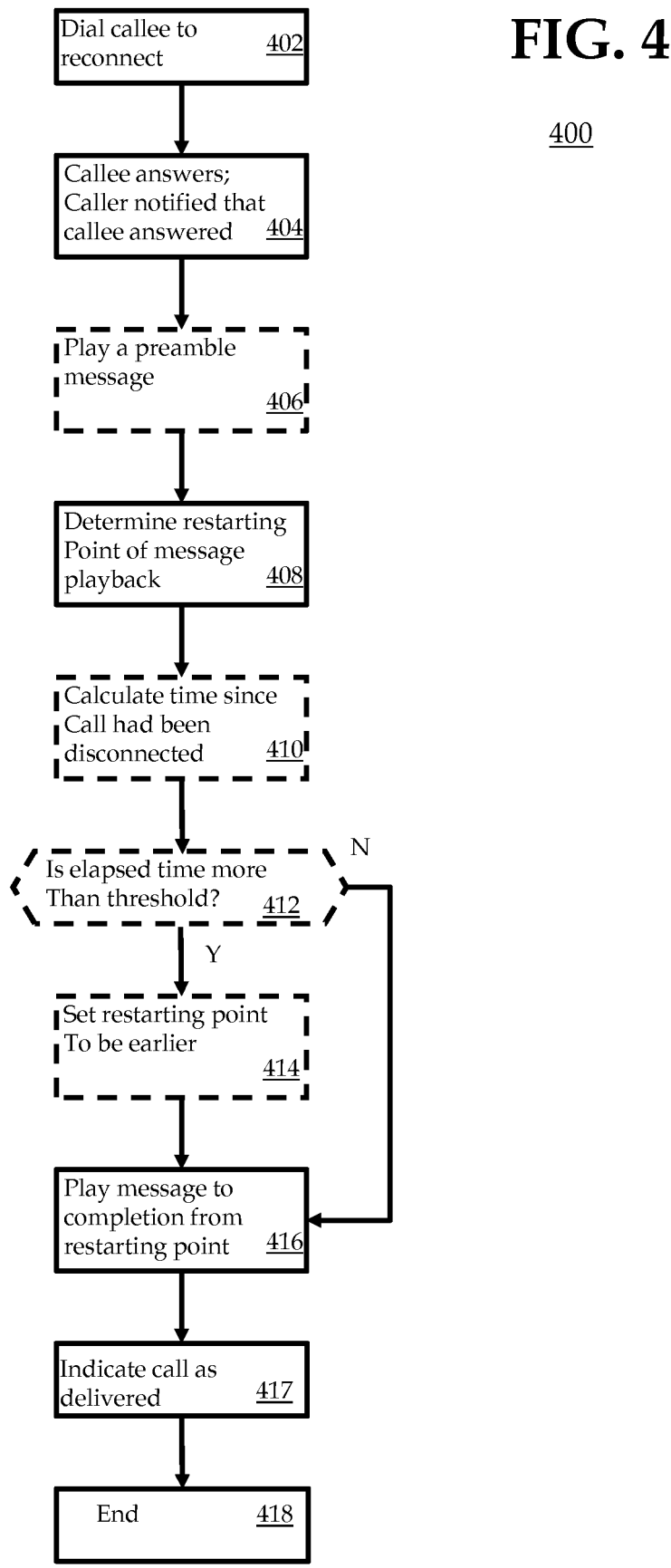
FIG. 4 illustrates at a high level of abstraction a process to call back a callee, in accordance with an embodiment of the present invention.

FIG. 4 illustrates a process 400 in accordance with an embodiment of the present invention. Process 400 may be useful when an outbound call center places a second (or subsequent) call at a rescheduled time. At step 402, a caller calls a callee. Next, at step 404, the callee answers the phone call, and the caller receives notification by well-known methods that the call was answered.

Optionally, at step 406, a preamble may be played. The preamble may be useful, e.g., in order to inform the callee the context of the call, or that the call is a continuation of a previous call and that the call contains important information, etc. The callee may be offered an option to listen to the entire automated message from the start.

Next, at step 408, an initial restarting point of the automated message will be determined. The initial restarting point may depend upon factors such as whether or not a critical segment of the automated call had already been delivered, or what point during which the previous call had been disconnected or put on hold, or which segments of the automated call had already been played to completion, and so forth. Restarting points will be explained in further detail with respect to FIG. 5.

Next, at optional step 410, an elapsed time may be calculated between the time the call was dropped by the callee and the present time when the callee has answered the call. The calculation may be useful when determining whether more of the automated message should be replayed, e.g., in order to refresh in the memory of the callee the context of the rescheduled call. If optional step 410 is not performed, control of process 400 may transition to step 416.

Next, at optional decision step 412, a decision may be made whether the elapsed time calculated in step 410 exceeds a predetermined threshold. If the result of decision step 412 is negative, then control of process 400 transitions to step 416. If the result of decision step 412 is positive, then control of process 400 transitions to optional step 414. If optional decision step 412 is not performed, then control of process 400 transitions directly to step 416.

At optional step 414, the restarting point when the message is replayed may be set to an earlier point than the initial starting point set at step 408. Replaying from an earlier point may be useful if it is desired to give more context of the call to the callee, for example if it has been a relatively long time since the previous call had been placed. More context may be needed when a longer time gap exists between the first call and the rescheduled call. If step 414 is not performed, then control of process 400 passes to step 416.

At step 416, the caller starts playing the automated message to completion from the restarting point. If the callee again disconnects from the call during step 416, then process 300 may be invoked. If the callee again places the call on hold during step 416, then process 200 may be invoked. If the call is played to completion, then control of process 400 transitions to step 417.

At step 417, the call is indicated as having been delivered. Control of process 400 then transitions to step 418 at which process 400 ends.

Persons of skill in the art will recognize that certain steps of process 400 may be performed in a different order than depicted, or may be performed in parallel.

Figure 5:
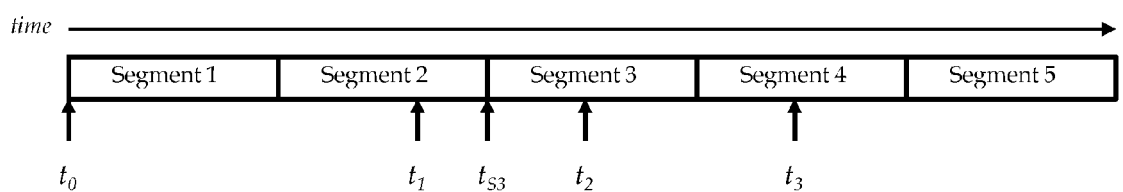
FIG. 5 illustrates a timeline for an automated call, in accordance with an embodiment of the present invention.

FIG. 5 illustrates a timeline 500 of an automated call in accordance with an embodiment of the present invention. Timeline 500 as illustrated includes five consecutive segments, beginning at time $t_0$, and progressing toward the right. Times illustrated in FIG. 5 are relative to the start of timeline 500, marked as $t_0$.

If a call made by a caller at time $t_0$ is dropped by a callee (or placed indefinitely on hold by the callee) at any of times $t_1$, $t_2$, or $t_3$, the known art will either mark the call as being completed, or will reschedule the call for another time with playback beginning at time $t_0$. The known art does not recognize that certain segments of the call may be critical and, even if certain parts are deemed critical, the known art does not treat a rescheduled call differently depending upon when during a call the callee dropped the call.

In contrast, suppose that segment 3 is deemed to be a critical segment of the automated call. Embodiments in accordance with the present invention will treat playback of a rescheduled call differently depending upon whether the callee dropped the call (or placed the call indefinitely on hold) at $t_1$ (before the critical segment is played), $t_2$ (during playing of the critical segment), or at $t_3$ (after the critical segment is played).

If the callee drops the call (or places the call indefinitely on hold) at $t_1$, embodiments in accordance with the present invention will recognize that the critical segment has not yet been played. The call will be rescheduled for a later time. When the rescheduled call is answered, playback of the automated message may start at a point near $t_1$. Alternatively, playback may start at $t_0$ (the start of the entire message) or at a beginning of the segment including $t_1$.

If the callee drops the call (or places the call indefinitely on hold) at $t_2$, embodiments in accordance with the present invention will recognize that the critical segment has been only partially played. The call will be rescheduled for a later time. When the rescheduled call is answered, playback of the automated message may start no later than time $t_{s3}$, so that the callee hears the entire critical segment. In some embodiments, the playback may begin at an earlier segment starting time, or at the starting time $t_0$.

If the callee drops the call (or places the call indefinitely on hold) at $t_3$, embodiments in accordance with the present invention will recognize that the critical segment has been completely played. There is no need to reschedule the call for a later time, and no callback will be made to this callee for this automated message. In this way, calling center outbound resources may be conserved, and the callee will not be unduly annoyed by answering unnecessary calls.

In all cases of playback of a rescheduled call, embodiments in accordance with the present invention may play a relatively short preamble message at the start. Such a preamble message may be used to alert the callee that this is a rescheduled call, that certain portions may contain critical information, to announce other playback options (e.g., "press 1 to hear the message from the beginning" and so forth).

In some embodiments of playback of a rescheduled call, a restarting point for message playback may be set slightly earlier than indicted. This may be useful in order to give the callee additional context of the call where it is being restarted.

Embodiments of the present invention include a system having one or more processing units coupled to one or more memories. The one or more memories may be configured to store software that, when executed by the one or more processing unit, allows practice of embodiments, at least by use of processes described herein, including at least in FIGS. 2-5, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A computer-implemented method to administer an outbound automated call from a call center, comprising:

starting, by a playback module, playback of an automated message during the outbound automated call from a caller to a callee, wherein the message comprises a first portion having a first level of importance and a second portion having a second level of importance, wherein the second level of importance is greater than the first level of importance;

detecting, by a detection module, that the callee has disconnected the outbound automated call;

stopping, by the playback module, playback of the message;

determining, by a determination module, whether the second portion of the message has been played;
if the second portion of the message has not been played, administering the outbound automated call by:
rescheduling, by a scheduling module, the outbound automated call;
determining a time within the message to begin playback of the message during a rescheduled outbound automated call;
initiating an outbound call, by the playback module, at the rescheduled time; and playing the message starting at the determined playback time; and
indicating, by a notification module, the outbound automated call as having been delivered if the second portion of the message has been played.

2. The method of claim 1, further comprising: recording a time at which playback of the message was stopped.

3. A computer-implemented system to administer an outbound automated call from a call center, comprising:
a playback module configured to start playback of an automated message during the outbound automated call from a caller to a callee, wherein the message comprises a first portion having a first level of importance and a second portion having a second level of importance, wherein the second level of importance is greater than the first level of importance;
a detection module configured to detect that the callee has disconnected the outbound automated call;
a playback module configured to stop playback of the message; and
a determination module configured to determine whether the second portion of the message has been played;
a scheduling module configured to reschedule the outbound automated call if the second portion of the message has not been played and to determine a time within the message to begin playback of the message during a rescheduled outbound automated call;
the playback module configured to initiate an outbound call; and play the message staring at the determined playback time; and
a notification module configured to indicate the outbound automated call as having been delivered if the second portion of the message has been played.

4. The system of claim 3, further comprising: a recording module configured to record a time at which playback of the message was stopped.

5. A computer-implemented method to administer an outbound automated call from a call center, comprising:
starting, by a playback module, playback of an automated message during the outbound automated call from a caller to a callee, wherein the message comprises a first portion having a first level of importance and a second portion having a second level of importance, wherein the second level of importance is greater than the first level of importance;
detecting, by a detection module, that the callee has placed the outbound automated call on hold;
stopping, by the playback module, playback of the message;
determining, by a determination module, whether the second portion of the message has been played;
if the second portion of the message has not been played, administering the outbound automated call by:
rescheduling, by a scheduling module, the outbound automated call;
determining a time within the message to begin playback of the message during a rescheduled outbound automated call;
initiating an outbound call, by the playback module, at the rescheduled time; and playing the message starting at the determined playback time; and
indicating, by a notification module, the outbound automated call as having been delivered if the second portion of the message has been played.

6. The method of claim 5, further comprising: waiting up to a predetermined amount of time for the outbound automated call to be taken off hold.

7. The method of claim 6, further comprising: continuing playback of the outbound automated call if the outbound automated call has been taken off hold within the predetermined amount of time.

8. The method of claim 6, further comprising: dropping the outbound automated call if the outbound automated call has not been taken off hold within the predetermined amount of time.

* * * * *